(12) United States Patent
Lee

(10) Patent No.: US 7,663,712 B2
(45) Date of Patent: *Feb. 16, 2010

(54) BACKLIGHT UNIT WITH LINEARLY REDUCED DIVERGENCE HAVING THE WIDTH OF AN OUTPUT APERTURE VARY OVER THE LENGTH OF A LIGHT DIVERGENCE REDUCTION STRUCTURE

(75) Inventor: Junwon Lee, Webster, NY (US)

(73) Assignee: SKC Haas Display Films Co., Ltd., Choongchungnamdo (KR)

( * ) Notice: Subject to any disclaimer, the term of this patent is extended or adjusted under 35 U.S.C. 154(b) by 591 days.

This patent is subject to a terminal disclaimer.

(21) Appl. No.: 11/247,509

(22) Filed: Oct. 10, 2005

(65) Prior Publication Data

US 2007/0081110 A1    Apr. 12, 2007

(51) Int. Cl.
*G02F 1/1335* (2006.01)
*F21V 7/04* (2006.01)

(52) U.S. Cl. ............... 349/64; 349/62; 349/65; 362/619

(58) Field of Classification Search ............ 349/57, 349/61, 62, 64, 65, 95; 362/617–320
See application file for complete search history.

(56) References Cited

U.S. PATENT DOCUMENTS

| | | | |
|---|---|---|---|
| 5,396,350 A * | 3/1995 | Beeson et al. | 349/62 |
| 5,396,406 A * | 3/1995 | Ketchpel | 362/27 |
| 5,592,332 A | 1/1997 | Nishio et al. | |
| 5,611,611 A | 3/1997 | Ogino et al. | |
| 5,629,784 A * | 5/1997 | Abileah et al. | 349/112 |
| 5,779,337 A * | 7/1998 | Saito et al. | 362/619 |
| 5,839,823 A | 11/1998 | Hou et al. | |
| 5,887,964 A | 3/1999 | Higuchi et al. | |
| 5,917,664 A | 6/1999 | O'Neill et al. | |
| 5,931,555 A * | 8/1999 | Akahane et al. | 362/613 |
| 5,944,405 A | 8/1999 | Takeuchi et al. | |
| 5,995,690 A * | 11/1999 | Kotz et al. | 385/25 |
| 6,111,696 A | 8/2000 | Allen et al. | |
| 6,277,471 B1 | 8/2001 | Tang | |
| 6,280,063 B1 | 8/2001 | Fong et al. | |
| 6,356,391 B1 | 3/2002 | Gardiner et al. | |
| 6,425,675 B2 * | 7/2002 | Onishi et al. | 362/607 |
| 6,464,365 B1 | 10/2002 | Gunn et al. | |

(Continued)

*Primary Examiner*—Andrew Schechter
(74) *Attorney, Agent, or Firm*—Edwin Oh

(57) ABSTRACT

This invention relates to a display apparatus comprising: a) a light source; b) a light guiding plate for transmitting light from the light source outward from a two-dimensional light-providing surface, one dimension of the light-providing surface defined in a width direction orthogonal to the path of incident light from the light source defined in a width direction orthogonal to the path of incident light from the light source and the other dimension of the light-providing surface defined in a length direction, orthogonal to the width direction; c) a linear divergence reduction surface for reducing the divergence of light from the light providing surface predominantly with respect to the width direction, to provide a linearly divergence-reduced illumination, whereby divergence along the width direction at full-width half-maximum is less than about 50% of divergence at full-width half-maximum along the length direction; d) a liquid crystal display component for modulating the linearly divergence-reduced light to form a modulated light according to image data, and, e) a diffusing surface in the path of the modulated light.

9 Claims, 20 Drawing Sheets

U.S. PATENT DOCUMENTS

| | | |
|---|---|---|
| 7,441,936 B2 * | 10/2008 | Liao .......................... 362/626 |
| 2001/0053075 A1 | 12/2001 | Parker et al. |
| 2005/0185416 A1 | 8/2005 | Lee et al. |
| 2005/0190318 A1 | 9/2005 | Okumura et al. |

* cited by examiner

With compensation film

Without compensation

CONTRAST RATIO:
- — — 10
- — - — 50
- ——— 100

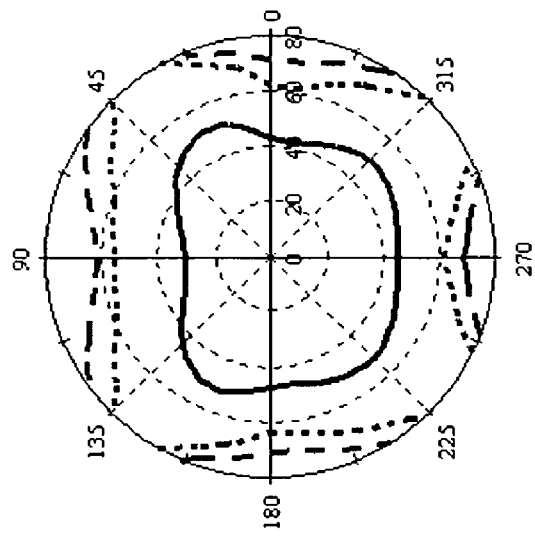
FIG. 4D *PRIOR ART*
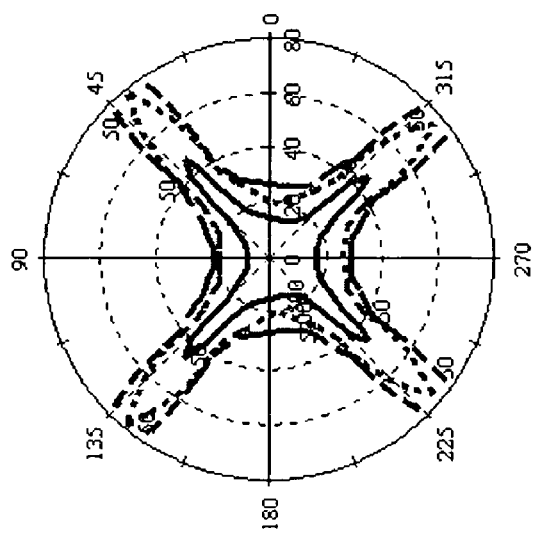
CONTRAST RATIO:
— — — 50
— - — 100
——— 500
FIG. 4C *PRIOR ART*

CONTRAST RATIO:
— — — 10
— - — 50
——— 100

BACKLIGHT UNIT WITH LINEARLY REDUCED DIVERGENCE HAVING THE WIDTH OF AN OUTPUT APERTURE VARY OVER THE LENGTH OF A LIGHT DIVERGENCE REDUCTION STRUCTURE

FIELD OF THE INVENTION

The invention generally relates to backlight illumination apparatus for use with backlit display devices, such as laptop LCD displays and more particularly relates to an apparatus and method for conditioning the angular divergence of the illumination provided.

BACKGROUND OF THE INVENTION

While LCD displays offer a compact, lightweight alternative to CRT monitors, there are many applications for which LCD displays are not satisfactory due to a low level of brightness, or more properly, luminance. The transmissive LCD used in conventional laptop computer displays is a type of backlit display, having a light-providing surface positioned behind the LCD for directing light outwards, towards the LCD. The light-providing surface itself provides illumination that is essentially Lambertian, that is, having an essentially constant luminance over a broad range of angles. With the goal of increasing on-axis and near-axis luminance, a number of brightness enhancement films have been proposed for redirecting a portion of this light having Lambertian distribution toward normal, relative to the display surface, thus providing some measure of reduced angular divergence of light for this illumination. Various proposed solutions for brightness or luminance enhancement for use with LCD displays and with other types of backlit display types have been described.

U.S. Pat. No. 5,592,332 (Nishio et al.) describes the use of two crossed lenticular lens surfaces for adjusting the angular range of light in an LCD display apparatus. U.S. Pat. No. 5,611,611 (Ogino et al.) describes a rear projection display using a combination of Fresnel and lenticular lens sheets for obtaining the desired light divergence and luminance. U.S. Pat. No. 6,111,696 (Allen et al.) describes a brightness enhancement film for a display or lighting fixture. The surface of the film facing the illumination source is smooth; the opposite surface has a series of structures, such as triangular prisms, for redirecting the illumination angle. The film refracts off-axis light to provide a degree of correction for directing light at narrower angles. However, this film design works best for redirecting off-axis light; incident light that is normal to the film surface may be reflected back toward the source, rather than transmitted.

U.S. Pat. No. 5,629,784 (Abileah et al.) describes various embodiments in which a prism sheet is employed for enhancing brightness, contrast ratio, and color uniformity of an LCD display of the reflective type. The brightness enhancement film is arranged with its structured surface facing the source of reflected light for providing improved luminance as well as reduced ambient light effects. Because this component is used with a reflective imaging device, the prism sheet is placed between the viewer and the LCD surface, rather than in the position used for transmissive LCD systems (that is, between the light source and the LCD). U.S. patent application Publication No. 2001/0053075 (Parker et al.) describes various types of surface structures used in light redirection films for LCD displays, including prisms and other structures. U.S. Pat. No. 5,887,964 (Higuchi et al.) describes a transparent prism sheet having extended prism structures along each surface for improved back-light propagation and luminance in an LCD display. However, much of the on-axis light is reflected rather than transmitted with this arrangement. The arrangement is usable only for small, hand-held displays and does not use a Lambertian light source.

U.S. Pat. No. 6,356,391 (Gardiner et al.) describes a pair of optical turning films for redirecting light in an LCD display, using an array of prisms, where the prisms can have different dimensions. U.S. Pat. No. 6,280,063 (Fong et al.) describes a brightness enhancement film with prism structures on one side of the film having blunted or rounded peaks. U.S. Pat. No. 6,277,471 (Tang) describes a brightness enhancement film having a plurality of generally triangular prism structures having curved facets. U.S. Pat. No. 5,917,664 (O'Neill et al.) describes a brightness enhancement film having "soft" cutoff angles in comparison with conventional film types, thereby mitigating the luminance change as viewing angle increases. U.S. Pat. No. 5,839,823 (Hou et al.) describes an illumination system with light recycling for a non-Lambertian source, using an array of microprisms. U.S. Pat. No. 5,396,350 (Beeson et al.) describes a backlight apparatus with light recycling features, employing an array of microprisms in contact with a light source for light redirection in illumination apparatus where heat may be a problem and where a relatively non-uniform light output is acceptable.

FIG. 1 shows one type of prior art solution, a brightness enhancement film 10 for enhancing light provided from a light source 18. Brightness enhancement film 10 has a smooth side 12 facing towards a Light Guiding Plate 14 (LGP) which contains a reflective surface 19, and rows of prismatic structures 16 facing an LCD component 20. This arrangement, as described in U.S. Pat. Nos. 6,111,696 and 5,629,784 (both listed above), and in U.S. Pat. No. 5,944,405 (Takeuchi et al.), generally works well, improving the on-axis luminance by refraction of off-axis light rays and directing a portion of this light closer to the normal optical axis, thereby providing a somewhat collimated illumination. As FIG. 1 shows, off-axis rays R1 are refracted toward normal. It is instructive to note, however, that, due to total internal reflection (TIR), near-axis light ray R3 can be refracted away from normal at a more extreme angle. In addition, on-axis light ray R4 can actually be reflected back toward light guiding plate 14 for diffusion and reflection from reflective surface 19 rather than being directed toward LCD component 20. This refraction of near-axis light and reflection of at least a portion of on-axis light back into light guiding plate 14 acts to adjust illumination luminance with respect to viewing angle, as is described subsequently. By the action of light guiding plate 14 and reflective surface 19, a portion of the light that is reflected back from brightness enhancement film 10 is eventually diffused and again directed outward toward the LCD component at a generally normal angle. There is, of course, some loss of light after multiple reflections, due to inefficiency of reflective surface 19.

The purpose of brightness enhancement film 10, then, is to redirect the light that is provided over a large angular range from light guiding plate 14, so that more of the output light it provides to LCD component 20 is directed toward normal, improving light direction by providing some degree of collimation. By doing this, brightness enhancement film 10 helps to improve display luminance not only when viewed straight-on, i.e. normal to the display surface, but also when viewed from oblique angles.

While it is considered advantageous to enhance on-axis luminance and provide a more uniform light surface, there are additional considerations for providing improved backlight illumination. Off-axis illumination, at incident angles other than normal to the LCD surface, can compromise image quality in a number of ways. The light-angle dependence of the LC device is shown in FIGS. 2A and 2B. In FIG. 2A, light at normal incidence is propagated through a rear polarizer 202, then through a distance d in an LC layer 200, over which its polarization is modulated according to the pixel state. The illumination is then viewed through a front polarizer 204. Off-axis light, as shown in FIG. 2B, passes through the same components, but is modulated over a distance d', as shown. Depending on the type of LC device and the angle θ, a slightly different optical phase retardation is applied to the off-axis light. Moreover, due to birefringence of LC materials, different indices of refraction apply for light of different polarization states. This behavior can result in color shifts over different viewing angles. In addition, this treatment of off-axis illumination can also degrade contrast due to stray light and reduce the overall grayscale resolution of the LC device. This behavior can be particularly pronounced with conventional Twisted-Nematic TN LCD components.

Optical compensators provide one solution for correcting this difference in handling off-axis light. Referring to FIG. 3, there is shown a display apparatus 100 using a TN LCD device as LC component 20, with supporting compensators 210,212 and polarizers 202, 204. In terms of its structure, compensator 210,212 typically uses an arrangement of discotic LC elements that act to counteract the positive birefringence of light directors in the LC modulator by geometrically mirroring the spatial orientation of a portion of these light directors. In operation, optical compensator 210, 212 provides a compensating negative birefringence to offset the positive birefringence of LCD component 20, shown as a TN LCD modulator in FIG. 3. With conventional TN devices, two compensator 210, 212 films are used, one on each side of the LCD. Using such an arrangement, contrast can be significantly improved over a range of viewing angles.

Since LCD displays were initially introduced, there have been a number of improvements in LC technology. The Vertically Aligned (VA) type of LCD has been shown to provide improved performance over wide viewing angles. Addition of a compensation film to a VA type LCD yields a significant improvement in contrast. For comparison, FIGS. 4A-4D show ISO contrast plots for the following configurations:

FIG. 4A shows an ISO contrast plot for a TN LCD without compensation, with a legend that applies for both FIGS. 4A and 4B;

FIG. 4B shows an ISO contrast plot for a TN LCD with compensation;

FIG. 4C shows an ISO contrast plot for a VA LCD without compensation, with a legend that applies for both FIGS. 4C and 4D;

FIG. 4D shows an ISO contrast plot for a VA LCD with compensation;

More recent types of LCD provide further improvements. The Optically Compensated Birefringence (OCB) LCD, as its name implies, provides a measure of built-in compensation for inherent birefringence, thus not requiring a compensator in many applications. For comparison, FIGS. 5A and 5B show ISO contrast plots for OCB LCDs without compensation and with compensation, respectively.

Another recent development, the In-Plane Switching (IPS) LCD, using a lateral electrical field for each pixel, provides a more uniform directional control of crystal orientation, resulting in reduced viewing angle-related differences in contrast and color. FIGS. 15A and 15B show ISO contrast plots for IPS LCDs without compensation and with compensation, respectively. In FIG. 15B, a first curve 66 indicates a contrast level of 250. A second curve 68 indicates a contrast level of 200. FIG. 17 shows the contrast profile of an IPS LCD.

With the earlier TN and VA types of LCD, some type of compensator film is generally needed in order to improve performance over wide viewing angles, as is shown in FIGS. 4A-4D. With the more recently developed OCB and IPS LCDs, compensator films may still be used; however, with OCB and IPS devices, the performance improvements provided by compensators may be offset by disadvantages of cost and light loss due to these additional films. It would be advantageous to provide improved contrast when using these devices, without requiring a compensation film.

One way to minimize or eliminate the need for a compensation film is to reduce the angle of incident illumination. Reducing the angular divergence of the illumination yields better contrast and color properties of the modulated light. Fully collimated light, having relatively small divergence angle from normal direction in any azimuthal direction, would be ideal. However, while it would be advantageous to provide fully collimated light from any point on light guiding plate 14 (FIG. 1), this proves to be difficult to achieve.

Referring to FIGS. 6A, 6B, and 6C, there are shown perspective, side, and top views respectively of illumination components for an LC display. Two azimuthal directions are defined: x being parallel to light source 18, y being perpendicular. The surface of light guiding plate 14 is the reference x,y plane. Here, light source 18 is a CCFL (Cold-Cathode Fluorescent Light) or similar component, having height $d_{CCFL}$ and length $W_{CCFL}$.

From considerations of etendue in y, it can be seen that is possible to provide reduced angular divergence along the y-direction. In the general case, etendue E is defined using:

$$E = A \times \Omega \quad (1)$$

where A is the area over which the beam propagates and Ω is the beam divergence angle. Since etendue should increase through the optical system, the following relationship holds for an apparatus using a light guiding plate:

$$d_{CCFL}\theta_{CCFL} <= L_{LGP}\theta_{LGP} \quad (2)$$

Where $\theta_{CCFL}$ is the divergence angle along y of the beam from the CCFL and $\theta_{LGP}$ is the divergence angle along y from the light guiding plate.

In practice, the value of $L_{LGP}$ is much larger than that of $d_{CCFL}$ so that it is possible to devise a backlight design having $\theta_{CCFL} \gg \theta_{LGP}$. This relationship implies that the illumination in y is not divergent over broad angles. However this condition does not hold likewise in the x direction. Instead, since $W_{CCFL}$ and $W_{LGP}$ are close in dimension, it would be difficult to provide good divergence reduction along the x-direction. With respect to etendue, a similar relationship to that of equation (2) holds in this case.

$$W_{CCFL}\phi_{CCFL} \leq W_{LGP}\phi_{LGP} \quad (3)$$

Where $\phi_{CCFL}$ is the divergence angle along x of the beam from the CCFL and $\phi_{LGP}$ is the divergence angle along x from the LGP.

It is difficult to design a backlighting apparatus that would allow $\phi_{LGP}$ to be much smaller than $\phi_{CCFL}$, that is, where good divergence-reduction would be provided if $W_{CCFL}$ and $W_{LGP}$ are close in dimension. This makes it difficult and inefficient to provide illumination that is collimated or, more generally, at reduced divergence with respect to both x and y axes. Thus, because it is difficult to obtain light at reduced divergence along both x- and y-axes, conventional designs typically employ a compensation film or similar compensator component as an aid to contrast improvement.

Thus, it can be seen that there is a need for a backlighting solution that provides illumination at favorable angles for backlit displays, is not significantly compromised with respect to overall light efficiency, and does not require a compensation film.

PROBLEM TO BE SOLVED BY THE INVENTION

The backlight unit of the present invention addresses the need for increased contrast and improved color performance of LC displays without the requirement for higher cost supporting components such as compensation films.

SUMMARY OF THE INVENTION

The present invention provides a display apparatus comprising:

a) a light source;

b) a light guiding plate for transmitting light from the light source outward from a two-dimensional light-providing surface, one dimension of the light-providing surface defined in a width direction orthogonal to the path of incident light from the light source and the other dimension of the light-providing surface defined in a length direction, orthogonal to the width direction;

c) a linear divergence reduction surface for reducing the divergence of light from the light providing surface predominantly with respect to the width direction, to provide a linearly divergence-reduced illumination, whereby divergence along the width direction at full-width half-maximum is less than about 50% of divergence at full-width half-maximum along the length direction;

d) a liquid crystal display component for modulating the linearly divergence-reduced light to form a modulated light according to image data, and, e) a diffusing surface in the path of the modulated light.

In one embodiment, the linear divergence reduction surface comprises a film substrate featured with a plurality of light divergence reduction structures, wherein each light divergence reduction structure is longitudinally extended in the length direction along the light-providing surface, each light divergence reduction structure comprising:

(a) an input aperture optically coupled to the light-providing surface;

(b) an output aperture distal from said input aperture, wherein the output aperture has a surface area that is larger than the surface area of the input aperture; and, (c) a pair of curved side walls between the output aperture and the input aperture and extending along the length direction; wherein, in a cross section taken orthogonally with respect to the width direction, the curved side walls approximate a parabolic curvature.

In another embodiment the display the liquid crystal display component exhibits an asymmetric response to incident light, such that, for light at normal incidence, the luminance of modulated light from the liquid crystal display component with respect to the width direction of the linear divergence reduction surface differs from the luminance of modulated light of the liquid crystal display component with respect to the length direction of the linear divergence reduction surface by more than 10 degrees at full-width half maximum. In one embodiment the width of the output aperture varies over the length of the light divergence reduction structure.

ADVANTAGEOUS EFFECT OF THE INVENTION

The linear divergence reduction apparatus and method of the present invention particularly improves the contrast and color provided by an OCB or IPS LCD, minimizing the need for a compensator.

BRIEF DESCRIPTION OF THE DRAWINGS

While the specification concludes with claims particularly pointing out and distinctly claiming the subject matter of the present invention, it is believed that the invention will be better understood from the following description when taken in conjunction with the accompanying drawings, wherein:

FIGS. 4C and 4D show ISO contrast plots for a VA LCD with and without a compensator;

DETAILED DESCRIPTION OF THE INVENTION

Figure 1:
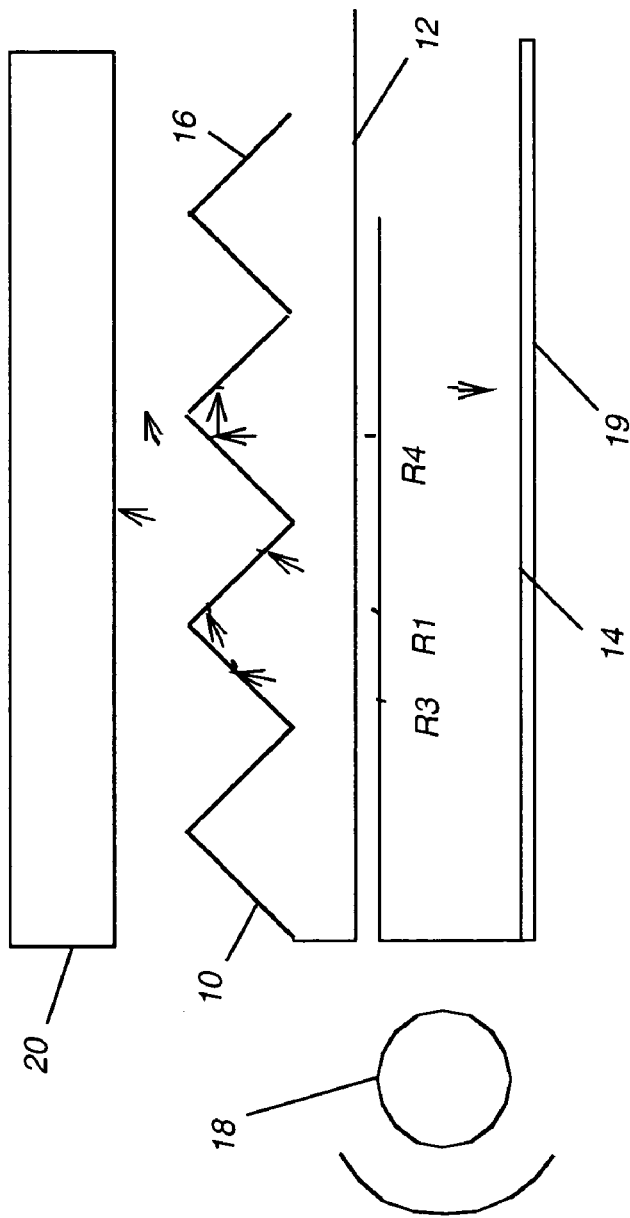
FIG. 1 is a cross-sectional side view showing the behavior of a prior art brightness enhancement film used with an LCD display.
Figures 2A, 2B:
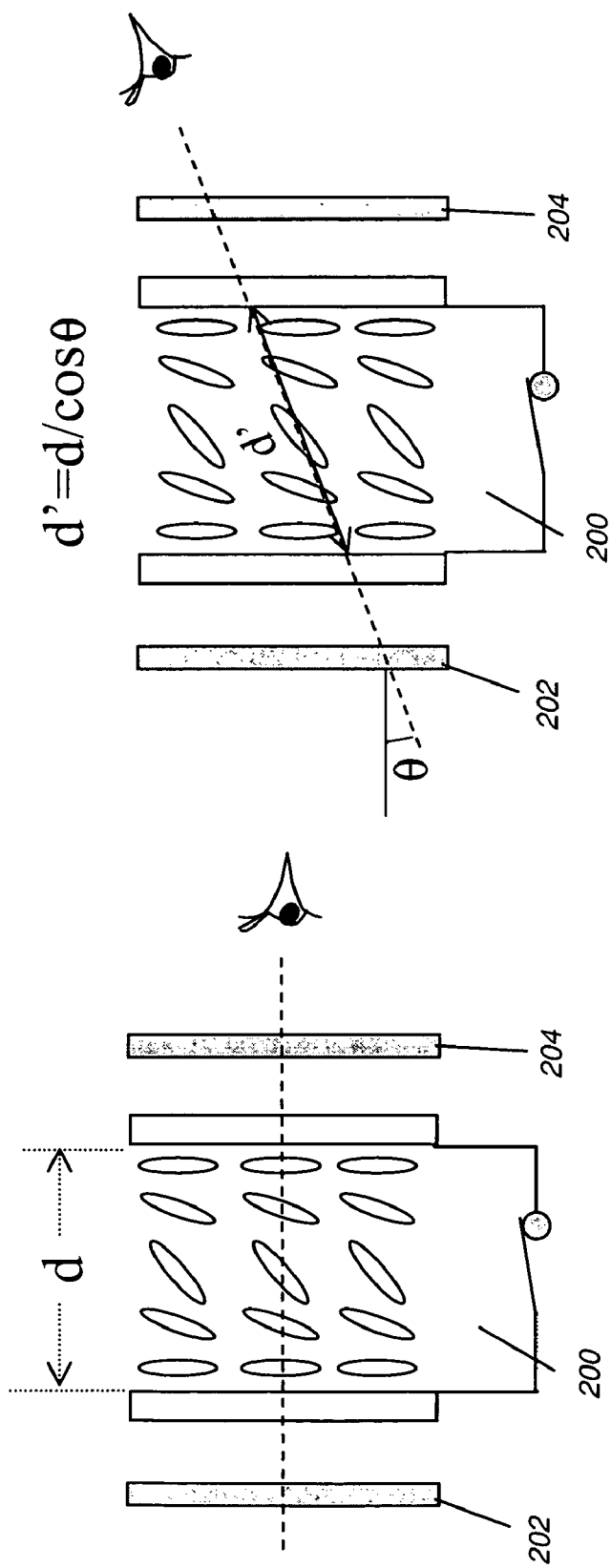
FIG. 2A is a cross sectional schematic showing an LC device viewed at a normal viewing angle.
FIG. 2B is a cross sectional schematic showing an LC device viewed at an off-axis viewing angle.

As described in the background section given above, it is difficult to provide, from a backlight unit, light that is well collimated in both x and y directions. This has hampered the development of effective solutions for backlight collimation with conventional LC devices. However, while it would be very challenging to provide well-collimated light in both x and y directions, good levels of divergence reduction can be obtained in the y direction. Specific types of LC cells, meanwhile, have been developed with a larger viewing angle in one direction. As was noted in the background section given above, the newly introduced IPS and OCB LCDs, and possibly of some types of VA LCDs, exhibit this behavior. For example, IPS type LCs have higher contrast in 0 and 90 degree directions, with poorer contrast in other directions. The present invention, then, adapts a novel strategy for divergence reduction for LCs that show this biased response, providing light in they-direction that exhibits divergence reduction using linearly extended parabolic reflectors.

Parabolic reflectors are well known in various types of applications for collecting or transmitting electromagnetic energy along an axis. In room lighting applications, for example, parabolic reflectors, and reflectors whose shape approximates a parabolic shape, are positioned around a lamp or other light source to collect light and direct it outward, generally in one direction. For optimal parabolic reflection of light along an axis, the light source would be positioned at a focal point of the parabolic reflector.

Efficient light concentrators, such as compound parabolic concentrators (CPC) have used principles of parabolic reflection for collecting light in various applications, particular for solar energy applications. For example, U.S. Pat. Nos. 4,002,499 and 4,003,638 (both to Winston) disclose the use of reflective parabolic concentrator elements for radiant energy collection. U.S. Pat. No. 6,384,320 (Chen) discloses the use of an array of reflective CPC devices used for a residential solar-power generation system. Light concentrators have also been used to support light sensing devices. For example, UK Patent Application GB 2 326 525 (Leonard) discloses the use of a reflective CPC array as a concentrator for obtaining light for a light sensor, such as a Charge-Coupled Device (CCD). Altogether, however, CPC and similar structures have been exploited for collecting and sensing light in various applications, rather than for achieving improved light distribution and redirection.

The parabolic reflector, familiar in lighting applications, utilizes the shape of the parabolic structure to provide a type of collimator, where the degree of collimation is based on how closely the structure shape approximates an ideal parabola and how closely the light source at its focal point approximates an ideal point source. For a "perfect" parabolic reflector having a "perfect" point source, the light from the point source is well collimated by the parabolic reflector. In practice, where the parabolic shape is approximated and the input light is from a conventional light source, true collimation is not achieved. Advantageously, however, significant divergence reduction of the incident light is effected by the CPC or similar structure. For this reason, the CPC structure of the present invention is termed a "divergence reduction structure", rather than "collimator".

Compound parabolic concentrators (CPCs) exhibit a number of favorable light-collecting properties. Referring now to the cross-sectional side view of FIG. 7, the apparatus of the present invention uses an array of linear light divergence reduction structures 32 of this basic shape, each light divergence reduction structure 32 having a substantially parabolic profile in cross section and linearly extended along the array. Within light divergence reduction structure 32, light rays R, emitted over a wide range of angles from a point P at an input aperture 33 on input surface 34, are reflected due to Total Internal Reflection (TIR) and generally emerge at the same output angle from output aperture 35 at output surface 36. Output aperture 35 is distal from input aperture 33. Specifically, light rays through point P that reflect from a side wall 38 of divergence reduction structure 32 generally exit at an angle θm that corresponds to the maximum beam angle θm of a reflected ray from that point. With the arrangement of light divergence reduction structure 32 against, or as an integral part of, light guiding plate 14, input aperture 33 provides the only exit for the bulk of the light energy within light guiding plate 14. Light guiding plate 14 prevents light leakage, allowing light to exit only through light divergence reduction structures 32, provided that angle θm is maintained at a suitable value.

Figure 7:
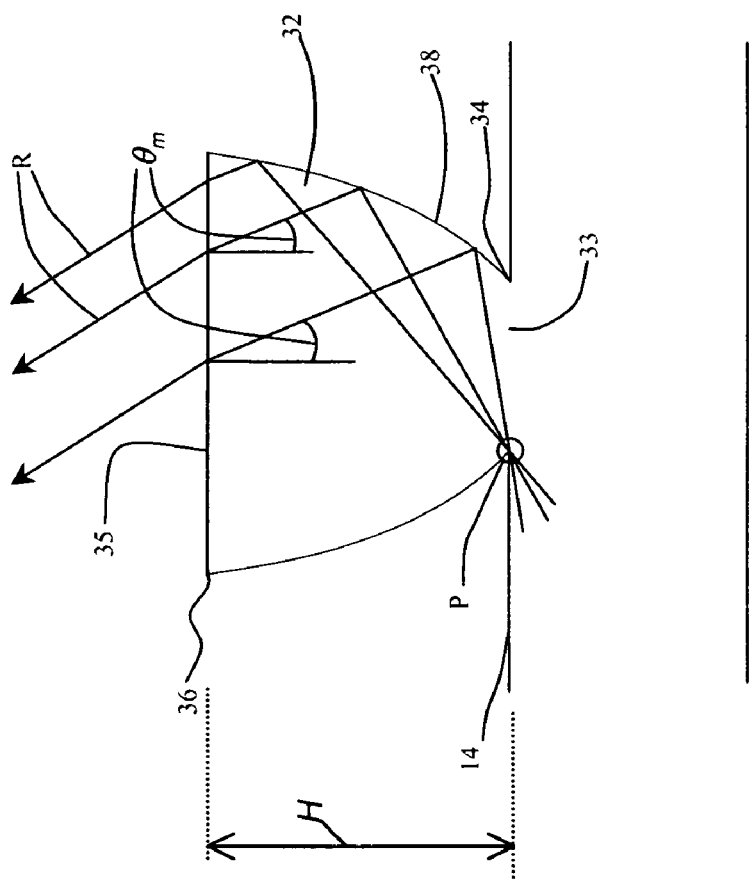
FIG. 7 is a cross-sectional view of a light divergence reduction structure in a linear divergence reduction film.

As is shown in FIG. 7, input surface 34 lies against the surface of light guiding plate 14. Light divergence reduction structures 32 may be fabricated as features formed on a film substrate, then attached to light guiding plate 14, with each light divergence reduction structure 32 attached at input surface 34. Alternately, light divergence reduction structures 32 may be molded or otherwise formed as an integral part of the emissive surface of light guiding plate 14. The same transparent material is typically used for fabrication of both light divergence reduction structure 32 and light guiding plate 14, whether light divergence reduction structure 32 is separately fabricated or is integral to light guiding plate 14. This arrangement provides the same index of refraction n for both light divergence reduction structure 32 and light guiding plate 14.

By way of review, TIR (for a structure in air) is achieved when critical angle $\phi_{TIR}$ for incident light is exceeded as defined in equation (4) below, where n is the index of refraction of the material used for light divergence reduction structure 32:

$$\varphi_{TIR} = \sin^{-1}\left(\frac{1}{n}\right) \tag{4}$$

Figure 8A:
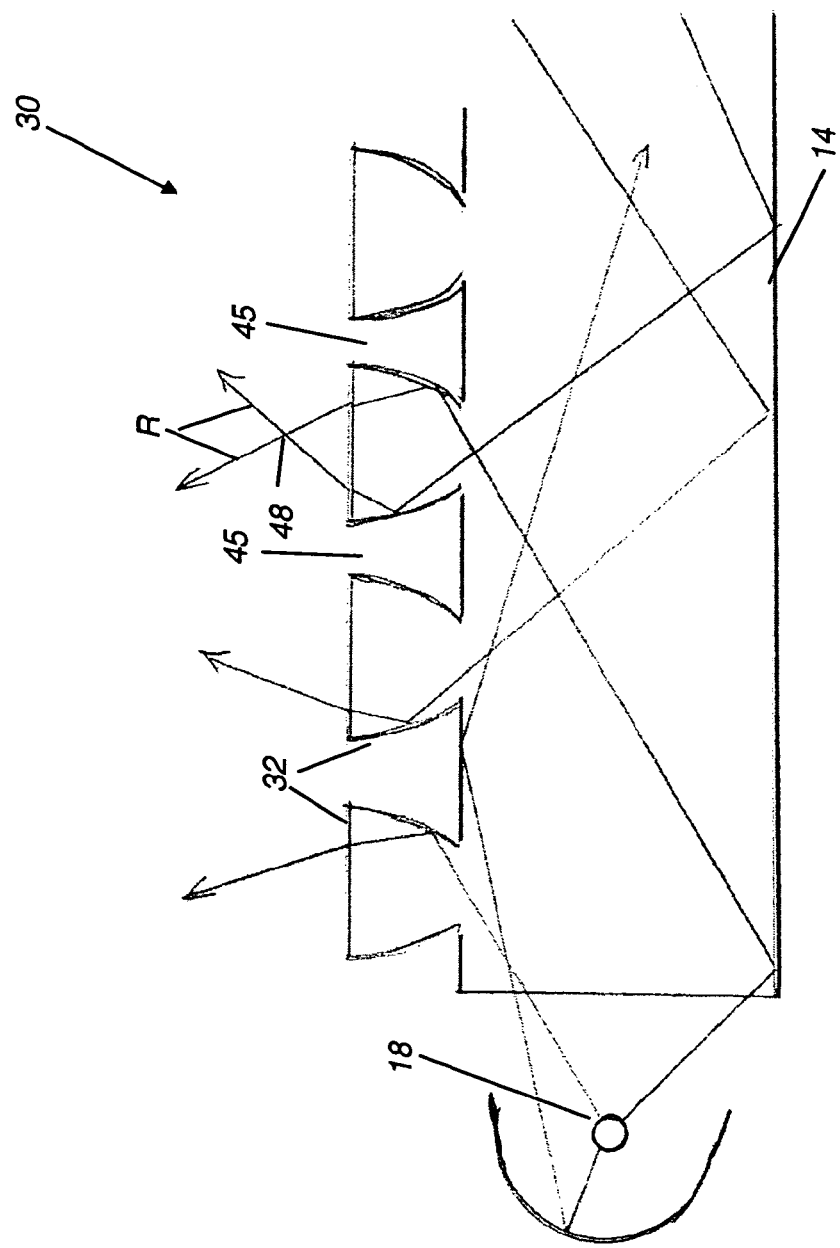
FIGS. 8A and 8B are cross sectional views showing light handling behavior of different embodiments of a linear divergence reduction film.

The present invention takes advantage of the light-handling behavior of a parabolic collector, as was shown by light divergence reduction structure 32 in FIG. 7, in one direction. Referring to FIG. 8A, there is shown a cross-section view of a portion of a linear divergence reduction film 30, providing a linear divergence reduction surface, coupled to light guiding plate 14. Ribbed light divergence reduction structures 32 are formed having a generally parabolic cross-section, extended along a width direction. As noted above, linear divergence reduction film 30 is part of, or is in contact with, light guiding plate 14. Each light divergence reduction structure 32 guides light originated from one or more light sources 18 and guided through light guiding plate 14, following light behavior well known in the display imaging arts.

Still referring to FIG. 8A, the cross-sectional shape of each linear light divergence reduction structure 32 can be considered as defined by a pair of grooves 45. It can be observed that the sides of each groove 45 are generally concave, thus forming the sides of light divergence reduction structures 32 to have a substantially convex shape.

Figure 8B:
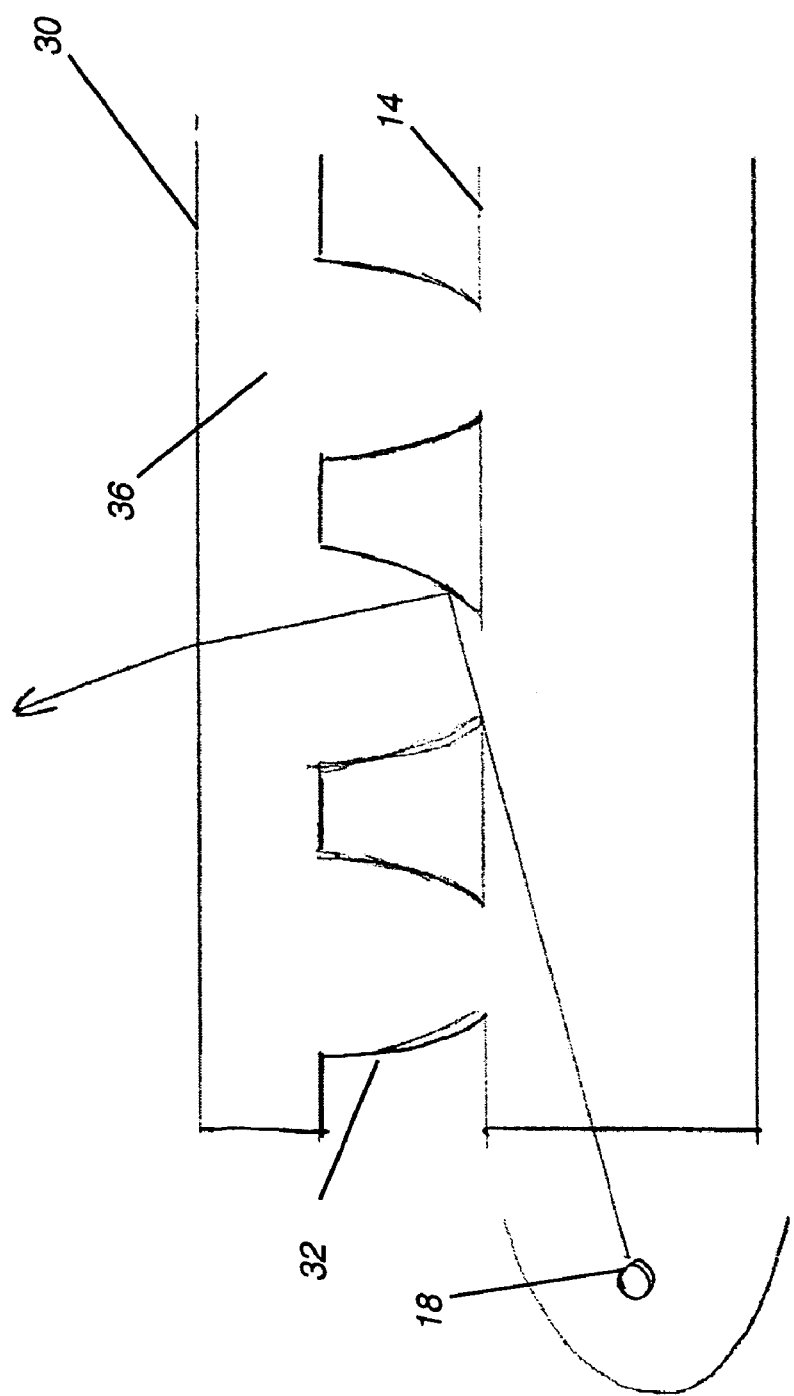

FIG. 8B shows an alternate embodiment, in which linear divergence reduction film 30 also has an additional output surface 36 that provides support structure for individual light divergence reduction structures 32.

Figure 9:
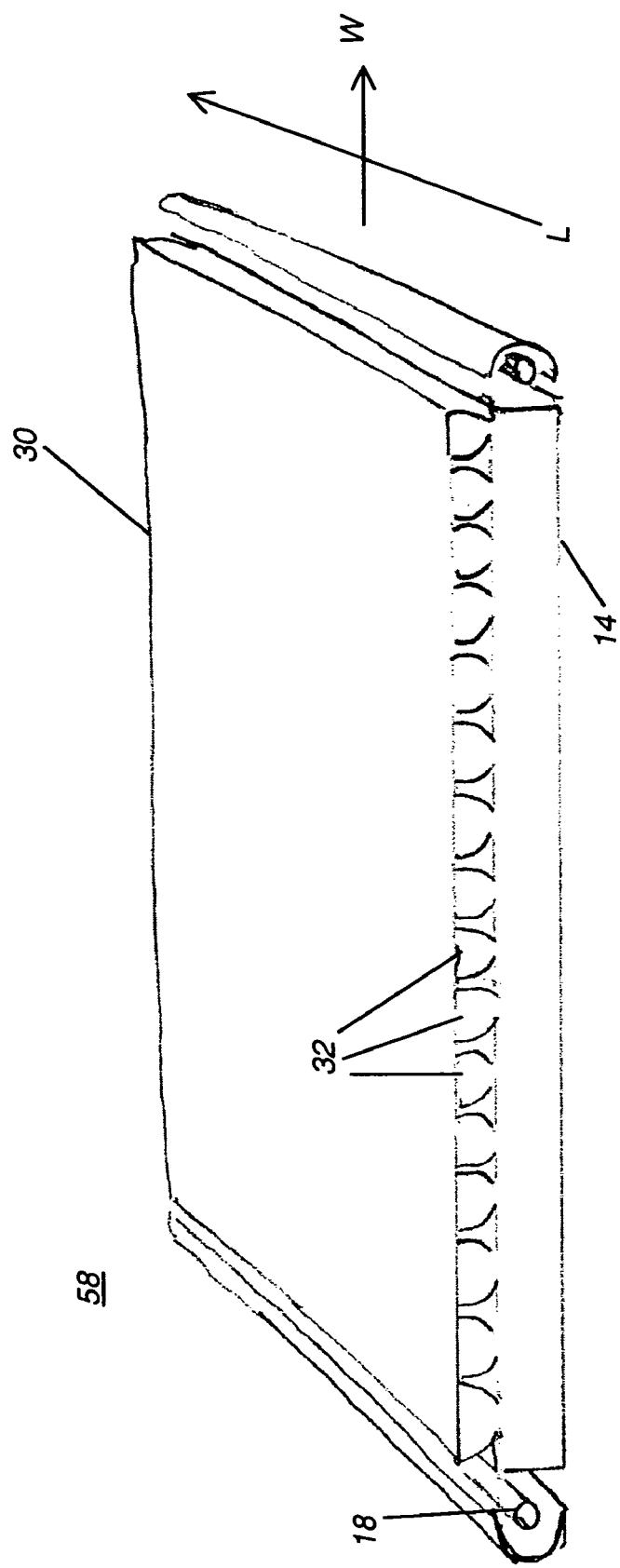
FIG. 9 is a perspective view of an illumination system using a linear divergence reduction film.

Referring to the perspective view of FIG. 9, an illumination system 58 with the three-dimensional structure of linear divergence reduction film 30 is shown, with light divergence reduction structures 32 exaggerated in size for illustrating key relationships. Each individual linear light divergence reduction structure 32 extends along the input side of linear divergence reduction film 30 in a length direction L along the film. In the orthogonal width direction W, linear light divergence reduction structures 32 appear as ribs or ridges (from the perspective of light guiding plate 14). With this arrangement, the advantageous properties of the ideal parabolic profile apply for light in one direction. That is, with respect to the directions indicated in the perspective view of FIG. 9, light angles in the W direction can be redirected, in the manner shown in FIG. 7, using linear divergence reduction film 30. In one embodiment, light divergence reduction structures 32 extend along the direction of length L, substantially in parallel with the central axis of light source 18, a conventional CCFL bulb.

Figure 10:
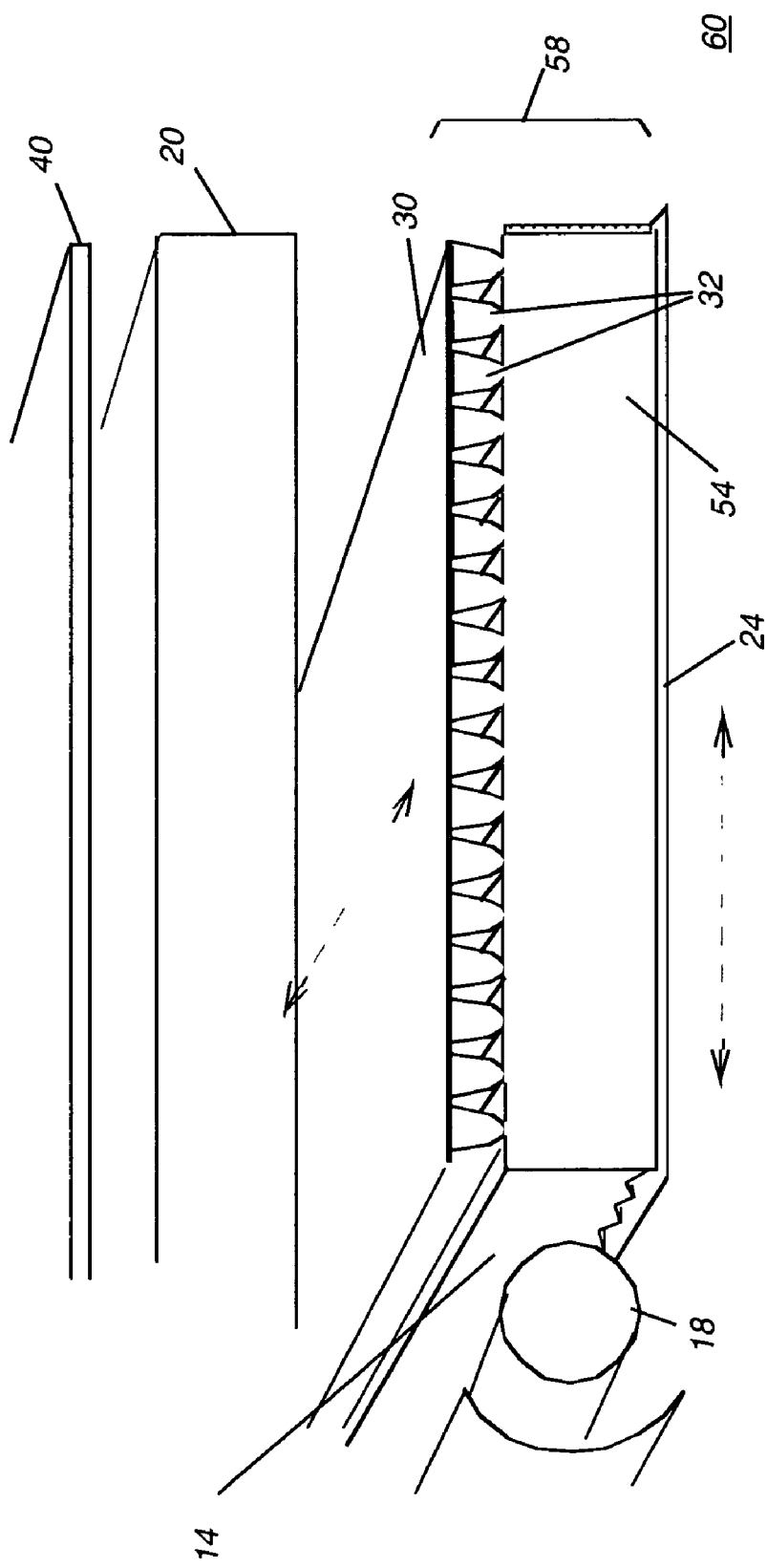
FIG. 10 is a perspective view of a display apparatus using a linear divergence reduction film.
Figure 11:
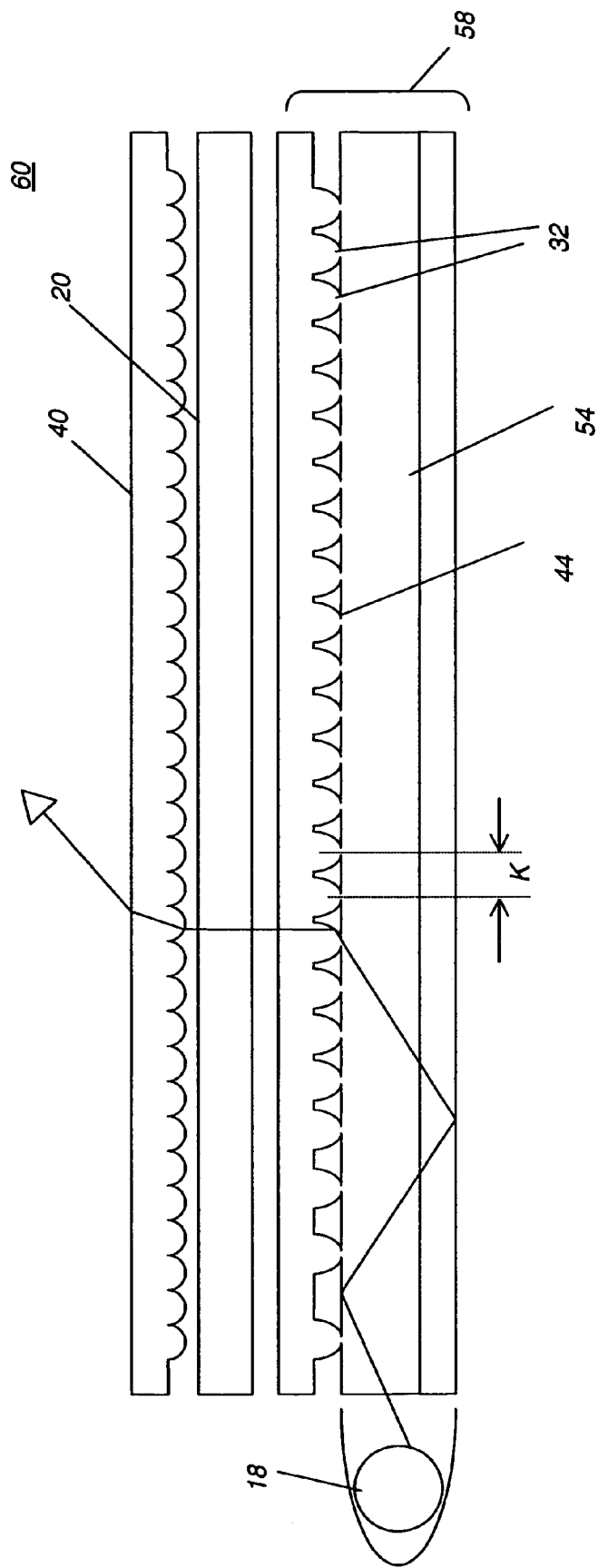
FIG. 11 is a side view of a display apparatus using a linear divergence reduction film.

As is shown in the perspective view of FIG. 10 and side view of FIG. 11, a combination of light-directing structures redirect light as part of an illumination system 58 for a display apparatus 60. In the embodiment shown, a single light source 18 provides light to a light guiding plate 54 having a reflective surface 24. Alternately, multiple light sources 18 could be provided. From the side view of FIG. 11, the substantially parabolic shape of each individual linear light divergence reduction structure 32 in linear divergence reduction film 30 is shown. Input surface 44 of linear divergence reduction film 30 lies against light guiding plate 54. Illumination system 58 delivers source illumination to an LCD component 20. On the viewer's side, a diffuser 40 is positioned for diffusing light transmitted through LCD component 20. Because illumination system 58 of the present invention provides light having reduced divergence along a direction that is well-suited to LC device characteristics, contrast ratios in the range of at least about 150:1 and up to about 200:1 or better can be achieved over a narrow viewing angle within about +/−5 degrees of normal. Thus, no compensation film or similar article is required.

It must again be emphasized that illumination system 58 components are not drawn to scale in FIGS. 10 and 11; these and other figures exaggerate size in an effort to show overall function of each component. For most embodiments, light divergence reduction structures 32 are typically much smaller in scale than is represented in these figures.

Optimizing the Cross-Sectional Shape of Light Divergence Reduction Structures 32

Figure 3:
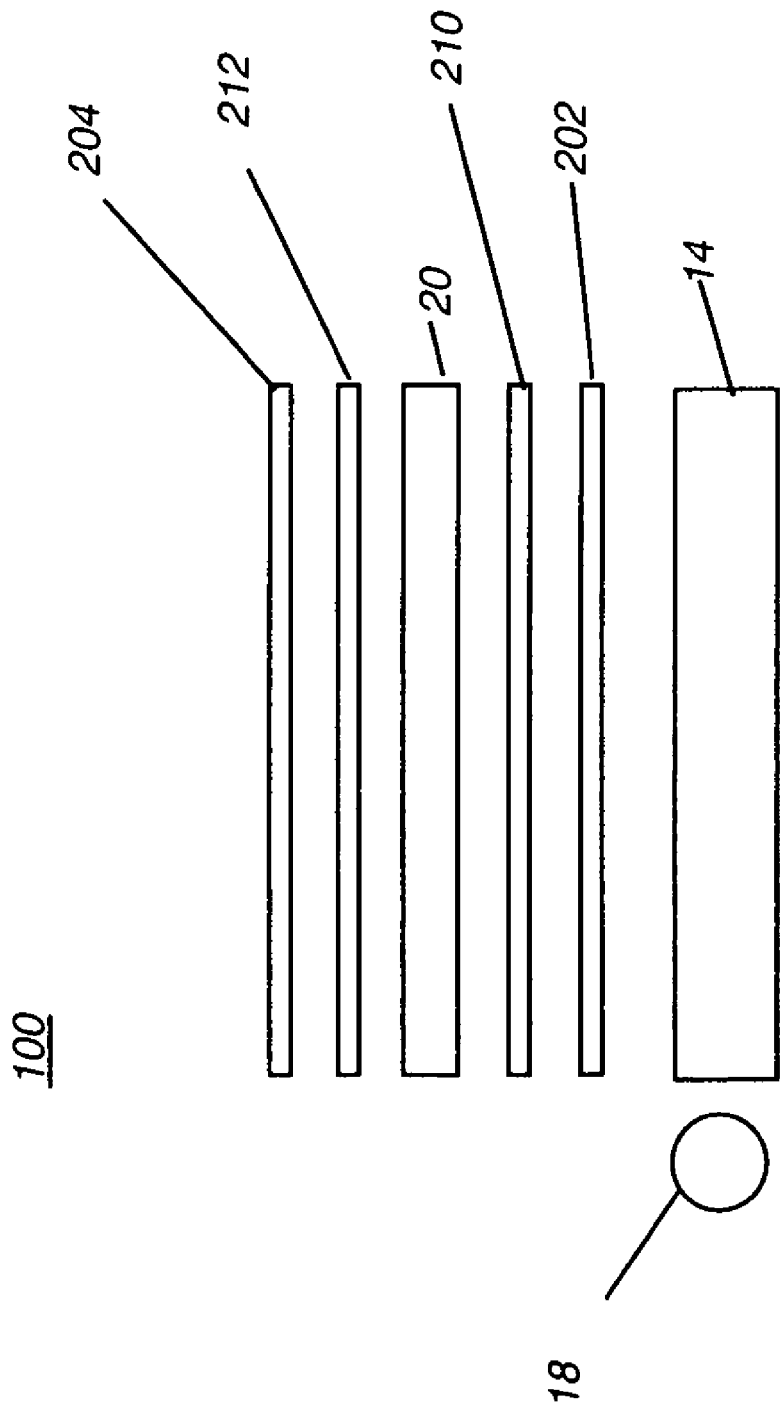
FIG. 3 is a side view schematic showing the various layered components of an LCD display apparatus.
Figure 4B:
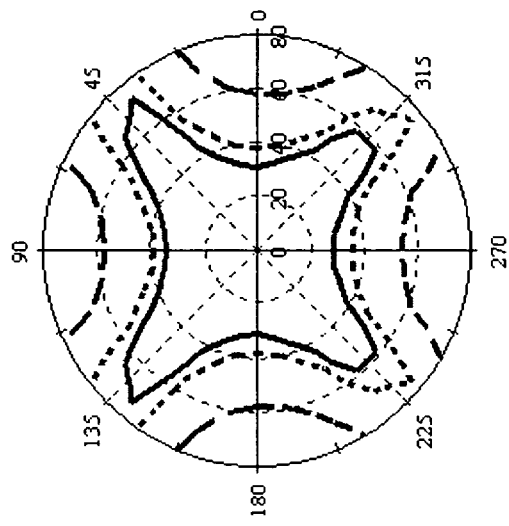
FIGS. 4A and 4B show ISO contrast plots for a TN LCD with and without a compensator.
Figure 4A:
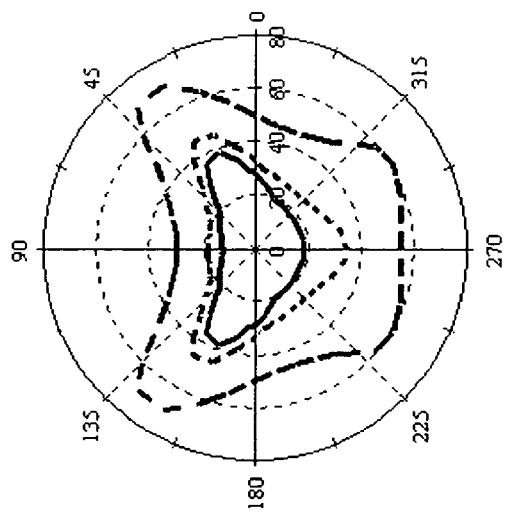
Figure 5B:
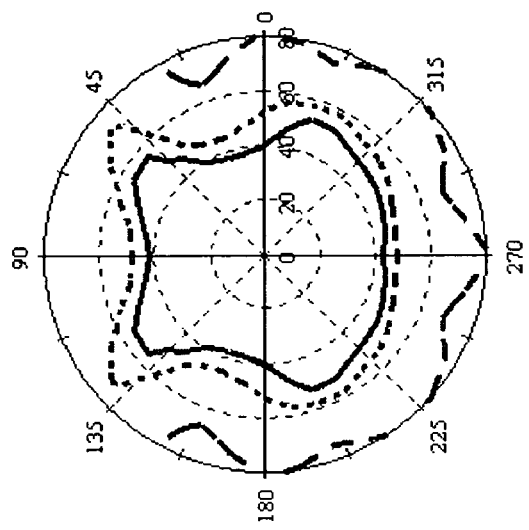
FIGS. 5A and 5B show ISO contrast plots for an OCB LCD with and without a compensator.
Figure 5A:
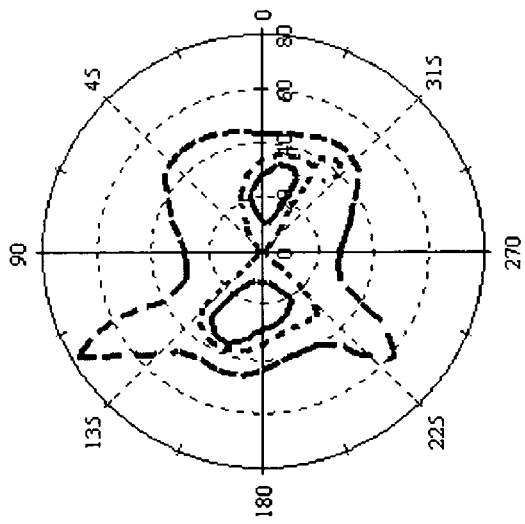

Referring back to FIG. 7, the theoretical performance of light divergence reduction structure 32 having side walls 38 that closely follow a parabolic profile was shown for a small number of rays R. In order to adapt this principle to practical applications and to be able to fabricate linear divergence reduction film 30 at lower cost, it would be beneficial to understand more clearly how light divergence reduction structure 32 operates. Then, armed with a more precise knowledge of light behavior through light divergence reduction structure 32, it is possible to adapt the idealized shape of light divergence reduction structure 32 (FIG. 3) to the practical application of light divergence reduction structure 32 (FIG. 4a) of linear divergence reduction film 30. For example, it is possible to relax some tolerances, and adapt a shape for light divergence reduction structure 32 that can be more easily fabricated. It is also possible to minimize crossing effects, as described above, by suitable selection of curvature and dimensional parameters.

Figure 12:
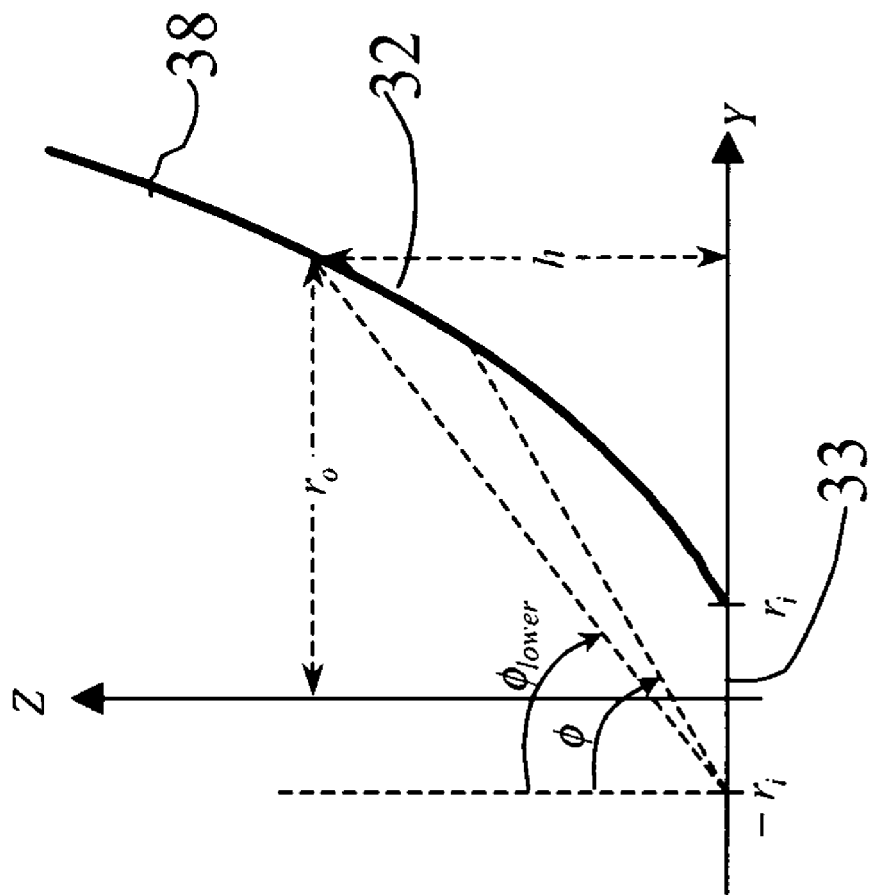
FIG. 12 is a close-up side view of key geometric relationships within a turning film component.

Referring to FIG. 12, there is shown a cross-sectional shape of side wall 38 of light divergence reduction structure 32, with key dimensions and angular relationships. As was noted with reference to FIG. 7, angle $\theta_m$ defines the maximum beam angle, relative to normal, for the given cross-sectional shape of light divergence reduction structure 32. This means that light entering light divergence reduction structure 32 at input aperture 33 is at some angle ϕ where $$\theta_m \leq \phi \leq 90° \quad (5)$$

Where angle $\theta_m$ is as shown in FIG. 7. Dimensions $r_i$ and $r_O$ in FIG. 12 are, respectively, input and output aperture radii of light divergence reduction structure 32.

In terms of x, z coordinates, the point at which a ray at angle ϕ impinges on side wall 38 is represented using the following notation $$P(x(\phi;\theta_m,\theta_r),z(\phi;\theta_m,\theta_r)) \quad (6)$$

where value ϕ is a variable that determines position along side wall 38 of light divergence reduction structure 32; values $\theta_m$ and $\theta_r$ are selectable design parameters. Generally, considering the luminance distribution of reflected beams from light divergence reduction structure 32, angle $\theta_m$ controls the overall angular range and angle $\theta_r$ controls the angular location of the luminance peak. Therefore, the angle $\theta_r$ can also be controlled to minimize or eliminate crossing effects, as explained subsequently. In order to position the peak luminance on axis, an approximate value for $\theta_r$ is computed using:

$$\theta_r \approx \frac{1}{2}\theta_m. \quad (7)$$

Typical values for $\theta_r$ are within the 10-30 degree range.

Note that angle $\theta_m$ is not necessarily equal to the angular range of luminance, but is proportional to this angular range. Likewise, angle $\theta_r$ is not equal to the angular location of the highest peak in luminance distribution, but determines the location of this peak.

A first step in optimizing the shape of light divergence reduction structure 32 is to select a suitable value for the input aperture radius, $r_i$. Important considerations for doing this include relative size; as $r_i$ diminishes, light divergence reduction structures 32 become less visible and may be less likely to cause Moiré patterns. However, if $r_i$ is too small, light divergence reduction structures 32 may be more difficult to fabricate.

Once a value for $r_i$ is determined, the next step is to select a suitable value for $\theta_m$. This depends on application criteria. For a small display, for example, it may be desirable to have smaller viewing angle and high luminance. In such a case, a suitable $\theta_m$ value might be in the 10-30 degree range. For a larger display, a larger $\theta_m$ value would normally be used.

As is noted above and as can be seen from FIG. 12, angle ϕ, measured from the line of $y(z)=-r_i$, varies between an upper bound of π/2 and some lower bound $\phi_{lower}$ that is generally larger than $\theta_m$. This lower bound $\phi_{lower}$ can then be used, along with design parameter values $\theta_m$ and $\theta_r$, to determine the output radius $r_o$ and height h of light divergence reduction structure 32.

Figure 13:
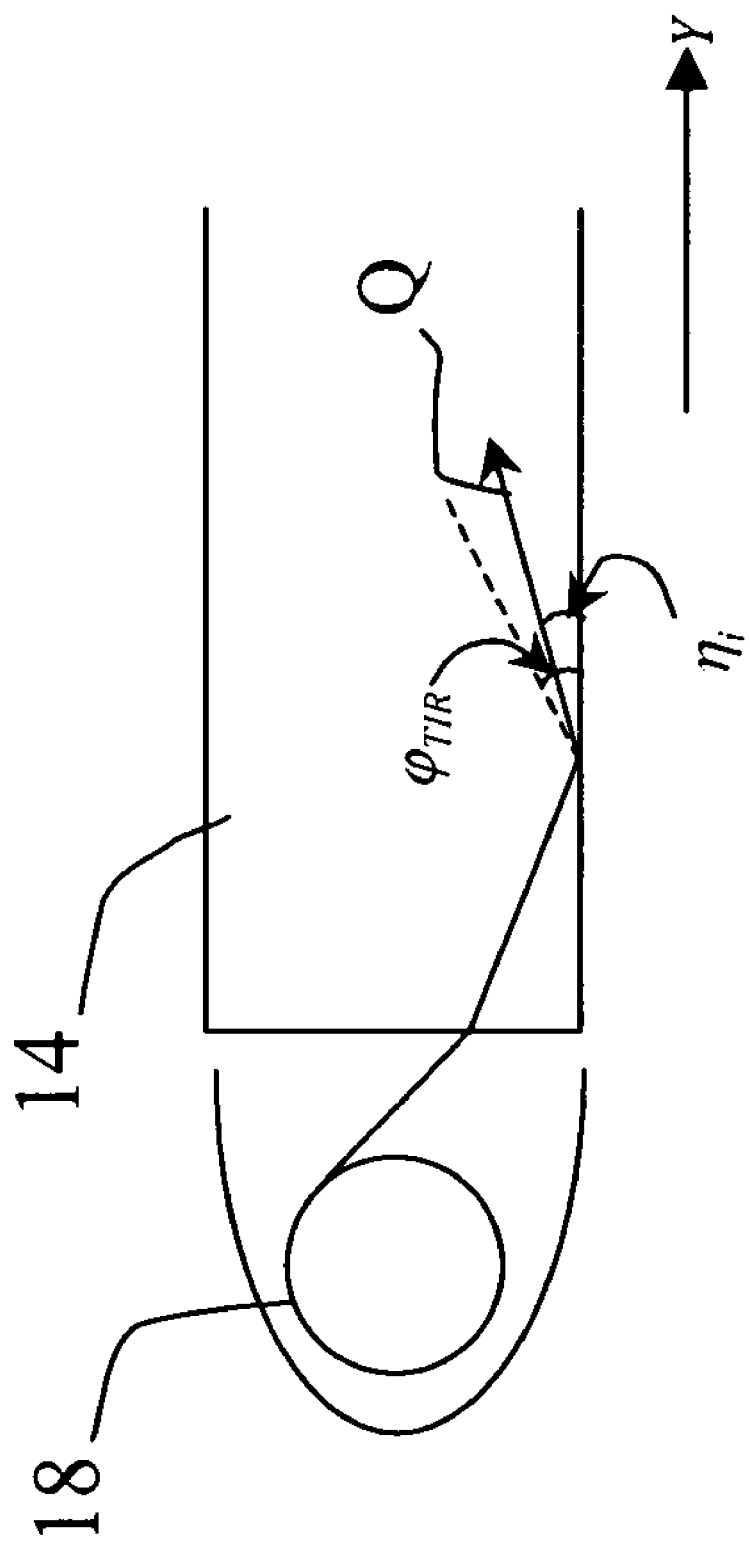
FIG. 13 is a close-up side view showing a light source and a portion of a light guiding plate.

In order to understand the criteria for specifying lower bound $\phi_{lower}$ in an application, it is useful to review how light guiding plate 14 works, as shown in FIGS. 12 and 13. Within light guiding plate 14, TIR is utilized to contain a light beam until it emerges to light guiding structure 32. Due to Fresnel's law, once a beam enters light guiding plate 14, its beam angle $\eta_i$ relative to the Y-axis, as shown in FIG. 13, remains smaller than the TIR angle $\phi_{TIR}$, as given in equation (4), where n is the refractive index of light guiding plate 14. Because light guiding structure 32 has the same (or very nearly the same) refractive index n, this angular restriction also applies within light guiding structure 32.

Figure 14:
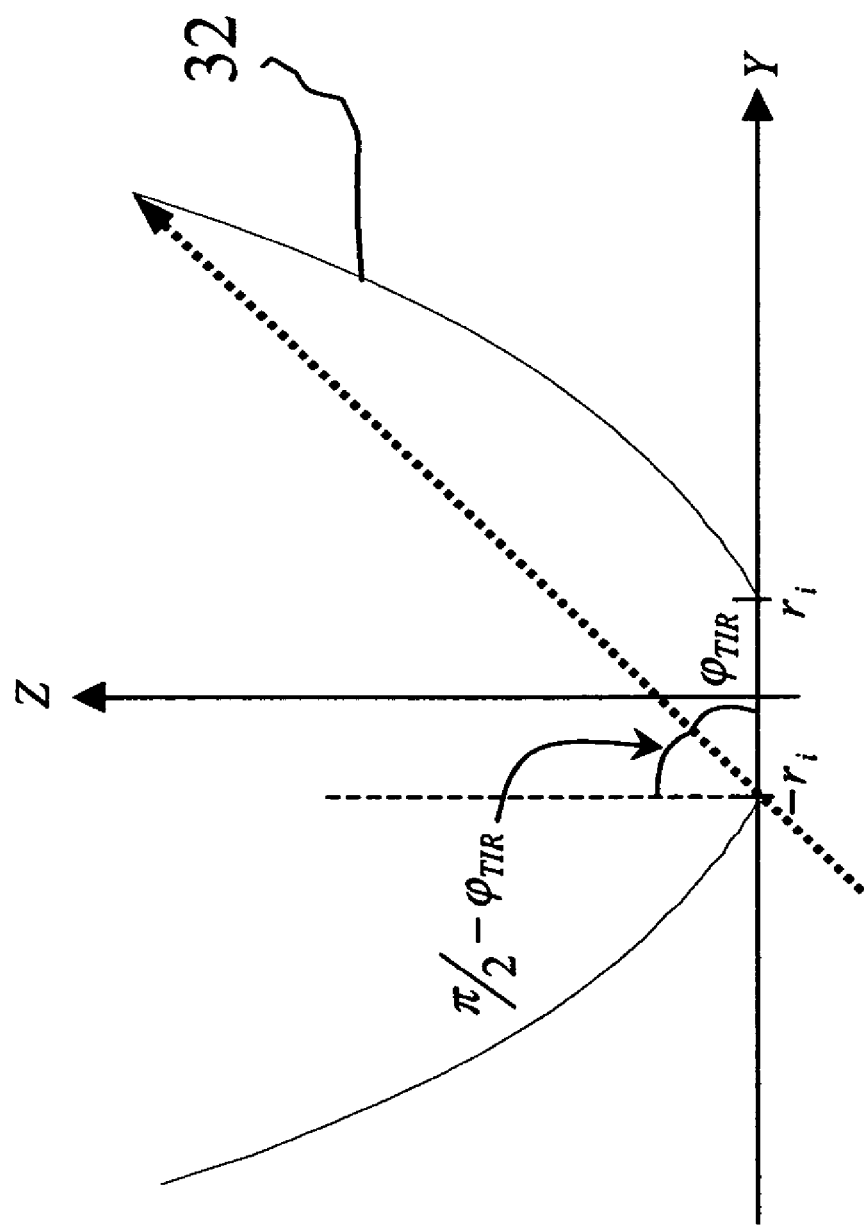
FIG. 14 is a close-up side view of key geometric relationships within a turning film component.

Referring now to FIG. 14, there is shown (as a dotted line) the path of a beam entering light guiding structure 32 at the most extreme possible angle, $\phi_{TIR}$. Relative to the normal (Z-axis), every other beam of light entering light guiding structure 32 is greater than or equal to:

$$\pi/2-\phi_{TIR} \quad (8)$$

Recall that $\phi_{lower}$ is measured from the line $y(z)=-r_i$, as shown in FIG. 12. It is recommended that $\phi_{lower}$ not be much smaller than $\pi/2-\phi_{TIR}$; otherwise, the resulting height h of light guiding structure 32 may be excessive, making fabrication more complex. It is preferred to keep height h short and to maintain a small aspect ratio (defined by height h over width $r_o$). In general:

$$\phi_{lower} \approx \pi/2-\phi_{TIR} = \pi/2-\sin^{-1}(1/n) \quad (9)$$

With this, the following range applies for variable $\phi$:

$$\pi/2-\sin^{-1}(1/n) \leq \phi \leq \pi/2 \quad (10)$$

With this value determined, the overall shape of light divergence reduction structure 32 can be computed using the following:

$$y(\phi;\theta_m,\theta_r) = \frac{2f\sin(\phi-\theta_r)}{1-\cos(\phi+\theta_m)} + r_i[2\cos(\theta_r)-1] \quad (11, 12)$$

$$z(\phi;\theta_m,\theta_r) = \frac{2f\cos(\phi-\theta_r)}{1-\cos(\phi+\theta_m)} - 2r_i\sin(\theta_r)$$

where $r_i$ is the radius of input surface and $f=r_i[1+\sin(\theta m)]$.

The output aperture radius $r_o$ and height h can be computed by finding the point on side wall 38 with the following coordinates:

$$y(\phi=\phi_{lower};\theta_m,\theta_r)=r_o, z(\phi=\phi_{lower};\theta_m,\theta_r)=h \quad (13)$$

The following computations determine output aperture radius, $r_o$ and height h:

$$r_o = \frac{2f\sin(\pi/2-\sin^{-1}(1/n)-\theta_r)}{1-\cos(\pi/2-\sin^{-1}(1/n)+\theta_m)} + r_i[2\cos(\theta_r)-1] \quad (14)$$

$$h = \frac{2f\cos(\pi/2-\sin^{-1}(1/n)+\theta_r)}{1-\cos(\pi/2-\sin^{-1}(1/n)+\theta_m)} - 2r_i\sin(\theta_r)$$

The following is a summary of steps, with example values, showing how suitable values can be determined in one embodiment:

Step 1. Determine values for $r_i$ and $\theta_m$.

In one embodiment, $r_i=50$ μm. For linear reduced divergence, ±10 degrees of viewing angle would be appropriate, which results in $\theta_m=10°$.

Step 2. Determine a value for $\theta_r$.

Using equation (7), $\theta_r$ can be about 5 degrees. Choose a practical value, for example, 6 degrees.

Step 3. Determine a value for parameter $\phi_{lower}$.

For light guiding plate 14 fabricated from PMMA (polymethyl methacrylate), n=1.49.

From equations (9) and (10), $\phi_{lower} \approx 40$ degrees.

Step 4. Compute values of radius $r_o$ and height h, using equation (14).

Here, $r_o=19.3$ μm and h=50.4 μm.

Design Considerations

There are necessarily a number of constraints on any workable design for light divergence reduction structure 32 (FIGS. 7-10), necessitating some consideration of tradeoffs for achieving the optimal design. For example, for increased luminance near a normal angle, it is typically best to keep $\theta_m$ within a small range of values. However, because input aperture 33 limits the overall amount of light into light divergence reduction structure 32, some compromise must be made between achieving a preferred range of angles and providing sufficient luminance at those angles.

In working with practical light divergence reduction structure 32 designs, it has been observed that impingement points $P(x(\phi), z(\phi))$ are generally distributed nearer to input aperture 33 than to output aperture 35, when light entering light guiding plate 14 is confined within a certain cone of angles as shown in FIG. 13. Due to this effect, it is possible to reduce height h, using the minimum height h specified in equation (11). This provides a number of practical advantages for fabrication of linear divergence reduction film 30, simplifying manufacture and enhancing mechanical stability. This modification also boosts brightness by improving the overall fill factor.

The problem of crossing effect was described above with respect to FIG. 8A. Referring back to the side view of FIG. 8A, it can be observed that rays from opposite directions can enter the same light divergence reduction structure 32 and may cross at a crossing point 48 along the transmission path. Where this behavior occurs, unwanted crossing effects may cause off-axis peak output from linear divergence reduction film 30. It has been shown that crossing effects can be minimized by rotating a side wall with an angle of $\theta_r$. This crossing effect can be minimized by a slight change to the side wall 38 curvature of light divergence reduction structure 32, without increasing the relative height h. Crossing point 48 from rays R in the embodiment of FIG. 8A is corrected by the resulting change of TIR behavior within light divergence reduction structure 32 caused by reshaping side walls 38. Rotation of side wall 38 slightly away from normal provides the further advantage of increasing on-axis luminance of linear divergence reduction film 30.

Materials Used

In general, linear divergence reduction film 30 can be formed in a number of ways. In a preferred embodiment, linear divergence reduction film 30 is formed from an acrylic film; however, linear divergence reduction film 30 may be formed from any of various types of transparent materials, including polycarbonate or polymethyl methacrylate (PMMA), for example. A requirement for the base substrate is an index of refraction, n, that is at least about $\sqrt{2}$ or greater. The material used for linear divergence reduction film 30 should have an index of refraction n that is identical to, or nearly the same as, the index of refraction n of light guiding plate 14, 54.

Typical Dimensions, Shape, and Fabrication

Typical preferred values and ranges for linear divergence reduction film 30 fabricated according to the present invention include the following:

(i) Pitch K between adjacent light divergence reduction structures 32 (FIG. 11): 80 microns. This value is typically between 10-200 microns.

(ii) Height H: 25 microns. The height value is typically in the range from 10-100 microns. A number of factors determine the optimal height for a specific application, including aperture sizes and side wall 38 curvature.

(iii) Prism angle for prism array structure 50: 100°.

(iv) Ratio of input aperture to output aperture: in the range from 1:1.5 to 1:10.

Linear divergence reduction film 30 can be used to improve uniformity for surface-imaging devices that have non-uniform brightness characteristics. In order to be useful for this purpose, a non-uniform structuring and spatial distribution of light divergence reduction structures 32 themselves can be used. Non-uniform structuring can be achieved, for example, by changes to the direction of light divergence reduction structures 32 along a length. With reference to FIG. 8A, spatial uniformity for linear divergence reduction film 30 may be enhanced using grooves 45 that do not run precisely in parallel along the input surface of the substrate used for linear divergence reduction film 30.

Pitch K can also be varied as necessary to provide improved uniformity. The pitch between adjacent light divergence reduction structures may be substantially equal or the pitch between adjacent light divergence reduction structures is varied. Non-homogeneous distribution of light divergence reduction structures 32 can be used, with different spacings for pitch K between light divergence reduction structures 32. Where two light sources 18 are used, pitch K could be at a minimum at the center of a sheet of linear divergence reduction film 30.

Linear divergence reduction film 30 of the present invention can be fabricated in a number of ways, such as using methods for forming grooves 45 (FIG. 8A) in a sheet of substrate material, for example. Scribing of a substrate is one possible method for forming light divergence reduction structures 32. Various techniques could alternately be employed for forming light divergence reduction structures 32, such as molding, including injection roll molding using web-based fabrication, or extrusion molding, using an extrusion plate. Linear divergence reduction film 30 could be fabricated as a sheet and laminated onto an existing type of light guiding plate 14, for example.

Figure 6A:
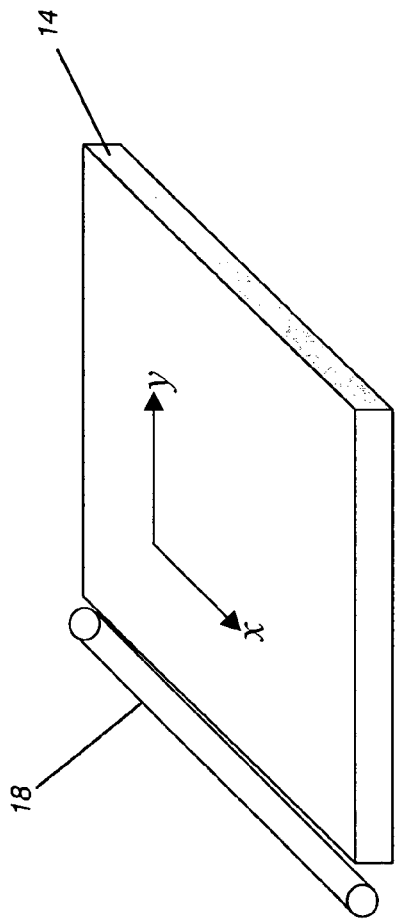
FIG. 6A is a perspective view showing key dimensional and geometric relationships of components of the illumination apparatus.
Figure 6C:
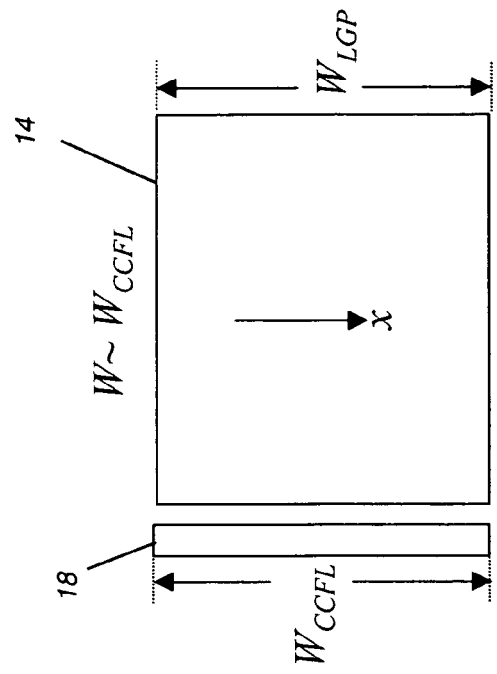
FIGS. 6B and 6C are side and top views, respectively, of components of the illumination apparatus of FIG. 6A.
Figure 6B:
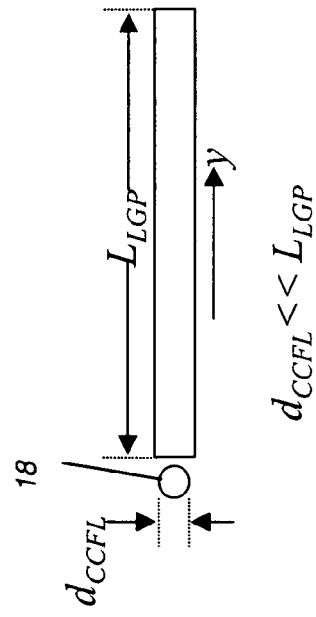

For using linear divergence reduction film 30 of the present invention in a backlight application, such as is shown in FIGS. 6a, 6b, and 7, the following special requirements should be met:

(i) the material used to form linear divergence reduction film 30 has substantially the same index of refraction n as that of light guiding plate 54, to within about +/−0.1;

(ii) light guiding plate 54 for this embodiment does not provide a diffuser for its emitted illumination;

(iii) input aperture 33 of light divergence reduction structure 32 is in direct contact with light guiding plate 54, that is, the flat surface of input aperture 33 lies against light guiding plate 54 without any air gap. Input aperture 33 may be glued, pressed into, molded onto, formed as part of, or otherwise attached to the surface of light guiding plate 54, for example.

For this embodiment, light guiding plate 54, a type of light pipe, also requires a reflective surface opposite its light source, using a configuration well known to those skilled in the art of LCD backlighting techniques.

Alternative Embodiment for Backlighting

Light source 18 could be a conventional CCFL fluorescent bulb or could be embodied as some other type of source or combination of sources. For example, one or more LEDs could be used instead of the conventional CCFL bulb as light source 18, directing light into light guiding plate 14 or other suitable waveguide.

Design of Lenticular Diffuser 40

Since linear divergence reduction film 30 provides improved redirection of light relative to one axis, its viewing angle may be too narrow in the direction of this axis. In order to provide proper viewing angle, it is necessary to utilize diffusion in one direction, using diffuser 40, disposed on the viewer's side of LCD component 20 (FIGS. 10, 11). A lenticular array or screen is well-suited for this purpose. A lenticular array would diffuse incoming light only in one direction by focusing the light. That is, its optical power is proportional to diffusing power. The focal length f is determined using;

$$f = \frac{r}{n-1} \qquad (15)$$

wherein r is radius of curvature and n is a refractive index of the screen. The beam divergence angle ω is determined by the focal length and half pitch of each lenslet:

$$\omega = \tan^{-1}(p/2f) \qquad (16)$$

wherein p is the pitch of the lenslet array.

Given a pitch p and viewing angle ω, the radius of curvature r can be determined using the following equation:

$$r = \frac{p(n-1)}{2\tan(\omega)} \qquad (17)$$

In one embodiment, the nominal lenslet pitch is 50 microns. In order to obtain +/−30 degrees of viewing angle, the focal length should then be about 43 microns. The corresponding radius of curvature is 86 microns for a material of refractive index 1.5.

Modeling Example for IPS LC Component

The use of linear divergence reduction film 30 in display apparatus 60 using an IPS component for LCD component 20 is particularly advantageous. Referring to the graph of FIG. 16, two luminance curves are shown. A curve 62 (solid line) shows luminance parallel to CCFL light source 18. A second curve 64 (dotted line) shows luminance perpendicular to CCFL light source 18.

Figure 15A:
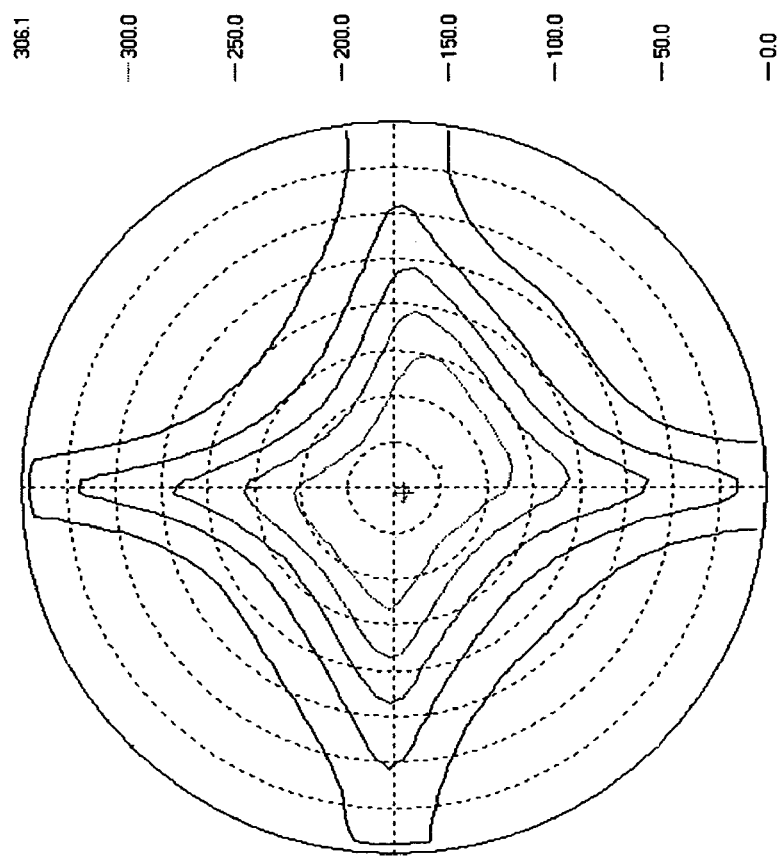
FIGS. 15A and 15B show ISO contrast plots for an IPS LCD with and without a compensator.
Figure 15B:
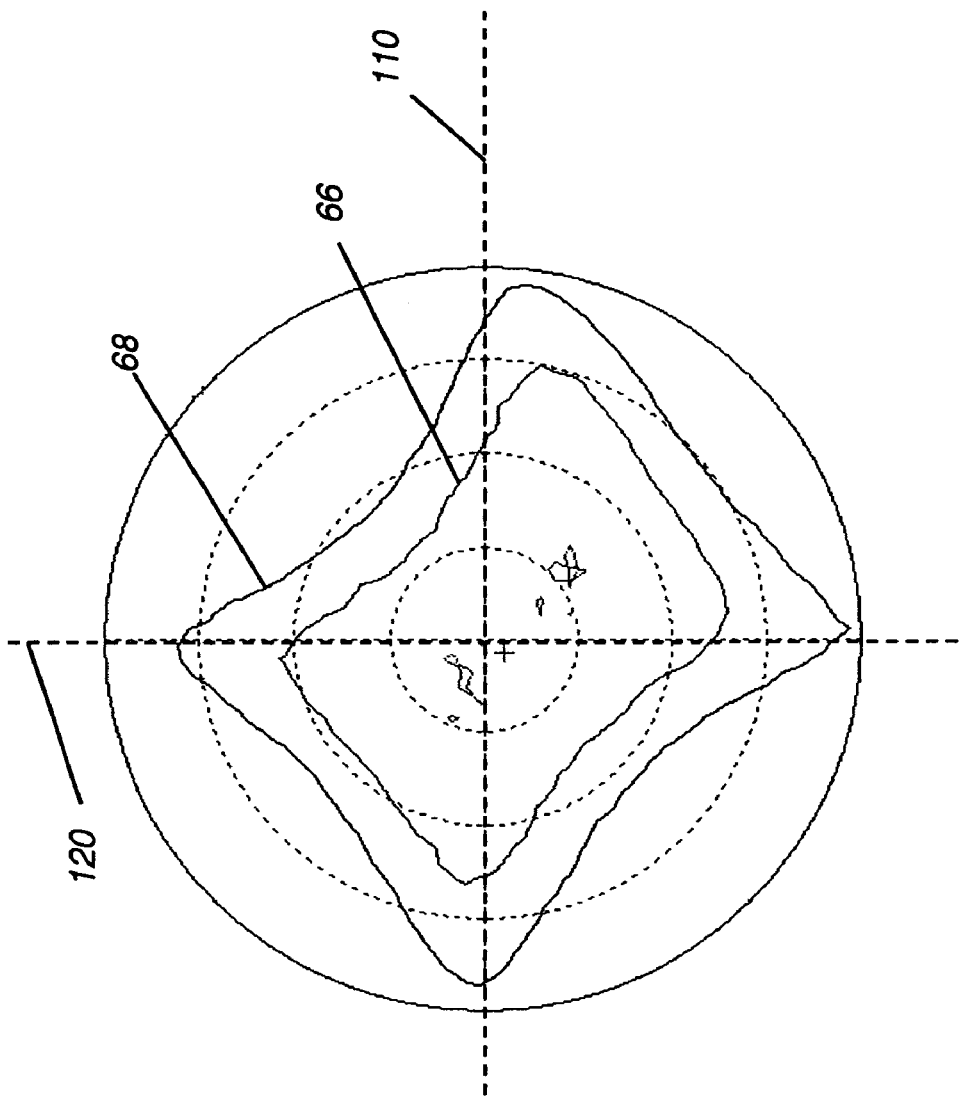
Figure 16:
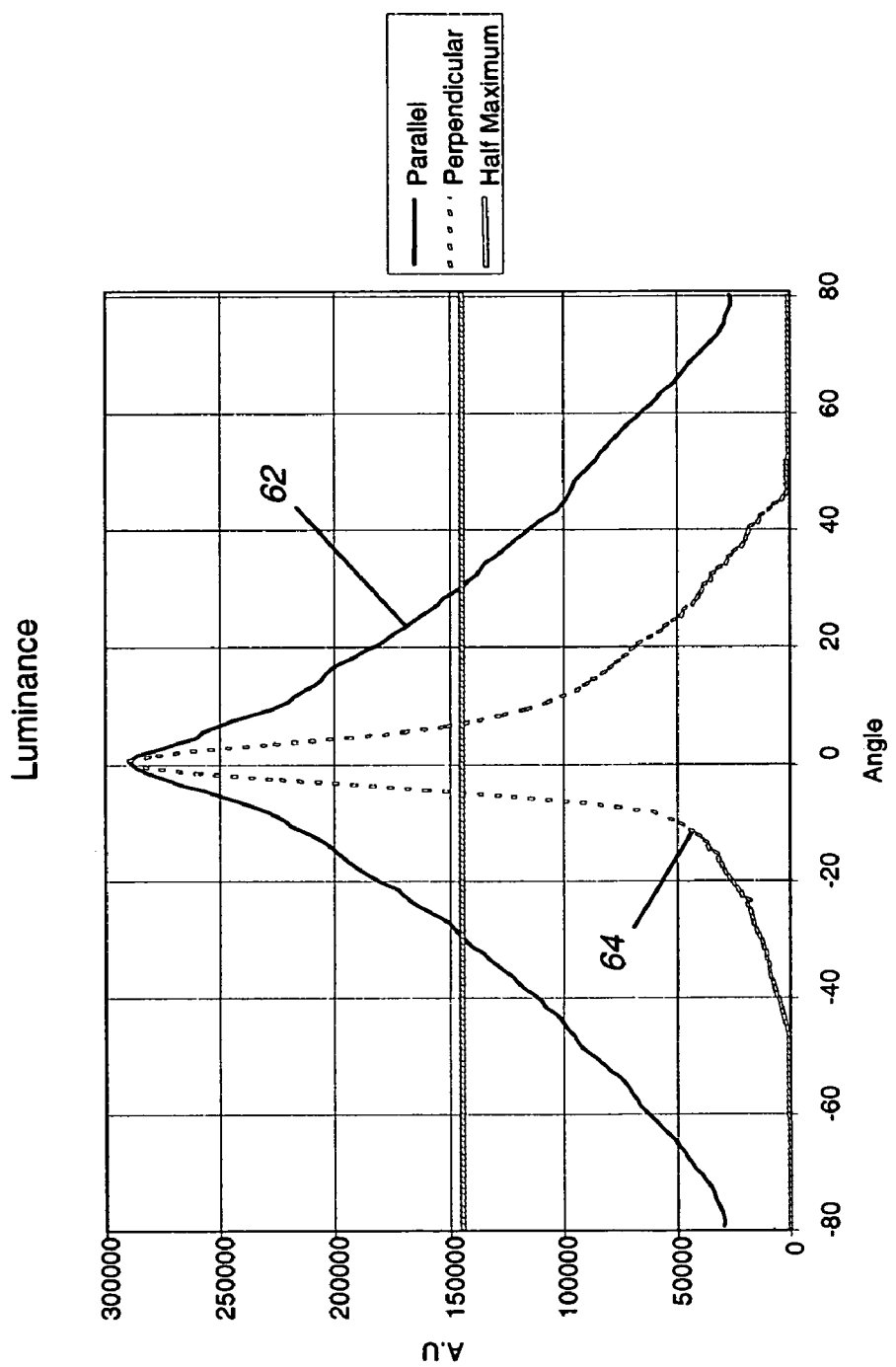
FIG. 16 is a graph showing the luminance profile of a linearly reduced divergence back light unit of the present invention; and, FIG. 17 shows the contrast profile of an IPS LCD.
Figure 17:
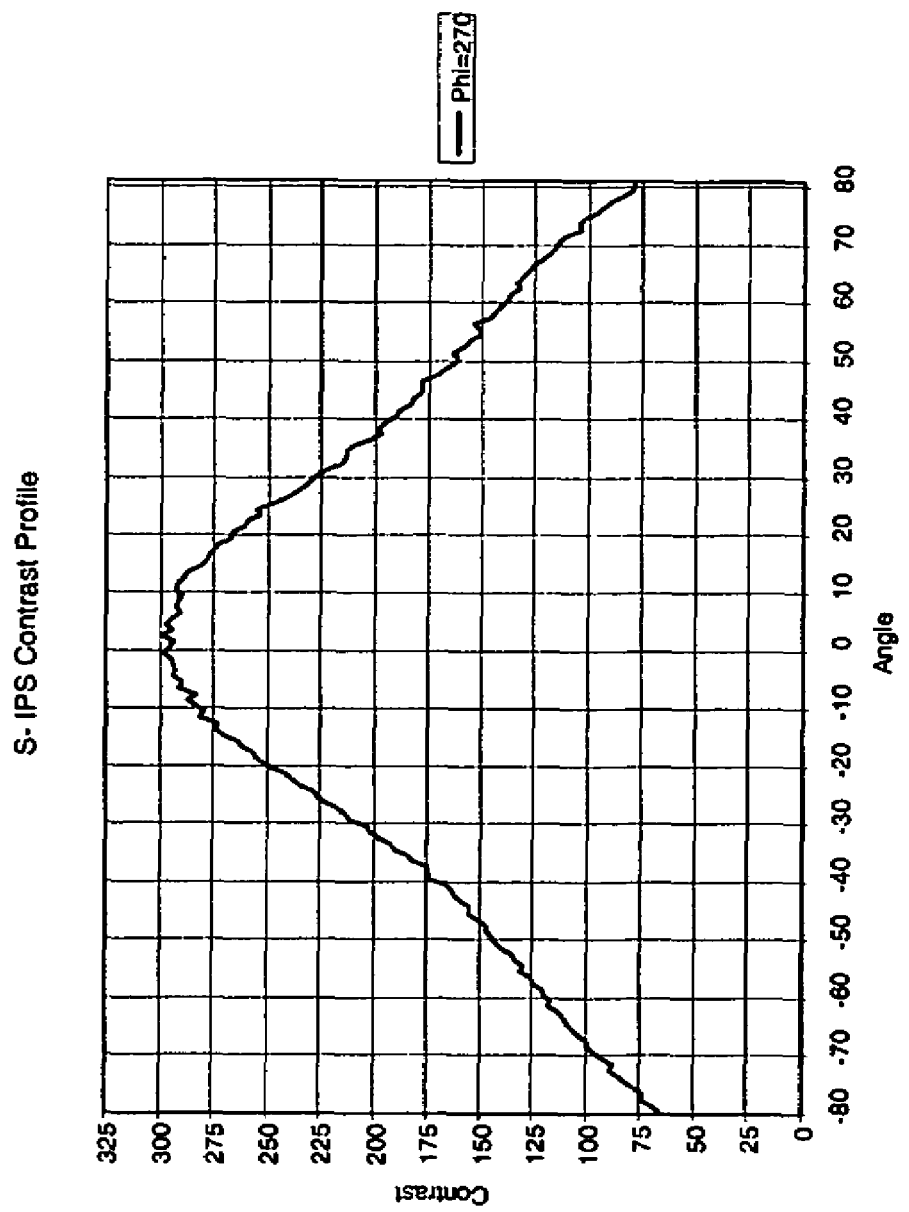

For most types of LCD components 20, the asymmetry of luminance shown in FIG. 16 would cause a noticeable asymmetry in the displayed image. However, referring back to the ISO contrast plot of FIG. 15B, it can be seen that the ISP type of LCD component 20 exhibits a measurable difference in contrast in orthogonal directions relative to the length of CCFL light source 18. In FIG. 15B, an axis 110 corresponds to light parallel to the length of CCFL light source 18. Another axis 120 corresponds to light perpendicular to the length of CCFL light source 18. As this plot shows, light parallel to the length of CCFL light source 18 exhibits higher contrast over a wider range of angles. That is, curves 66 and 68 broaden along axis 110. Light along this axis corresponds to curve 62 in FIG. 16, exhibiting, at Full-Width Half Maximum (FWHM), approximately +/−30 degrees. By comparison, light along orthogonal axis 120 corresponds to curve 64 in FIG. 16, showing, at FWHM, approximately +/−5 degrees.

By thus matching the asymmetry of linear divergence reduction film 30 to the asymmetry of an ISP type LCD component 20, the method of the present invention minimizes the need to equalize the divergence reduction of illumination in directions parallel and perpendicular to light source 18. Linear divergence reduction film 30 of the present invention thus provides improved luminance and contrast without significant compromises to overall light efficiency and without requiring a compensation film. This result can be contrasted with the apparatus disclosed in the commonly assigned application, "Brightness Enhancement Film Using A Linear Arrangement Of Light Concentrators" by Junwon Lee, which would typically require a compensation film or article of some type, particularly when used with a larger diameter display. Unlike the apparatus disclosed in this earlier application, the apparatus of the present invention, because it provides a relatively narrow viewing angle, requires diffuser 40 for spreading the angle of the light modulated by the LC device.

Linearly divergence-reduced illumination, as the term is used with respect to the present invention, is light having substantially more divergence reduction along one axis than along an orthogonal axis. At FWHM, linearly divergence-reduced illumination along one axis will span no more than 50% of the angular distance of light along the orthogonal axis. With linearly divergence-reduced illumination, then, beam divergence along one axis is substantially smaller than beam divergence along an orthogonal axis. Preferably, linearly divergence-reduced illumination has about +/−5 degrees at FWHM.

The invention has been described in detail with particular reference to certain preferred embodiments thereof, but it will be understood that variations and modifications can be effected within the scope of the invention as described above, and as noted in the appended claims, by a person of ordinary skill in the art without departing from the scope of the invention. For example, while pitch K can be constant for all structures on linear divergence reduction film 30, there may be advantages to varying pitch K over the width of linear divergence reduction film 30.

| PARTS LIST: | |
|---|---|
| 10. | Linear divergence reduction film |
| 12. | Smooth side |
| 14. | Light guiding plate |
| 16. | Prismatic structures |
| 18. | Light source |
| 19. | Reflective surface |
| 20. | LCD component |
| 22, 24. | Reflective surface |
| 30. | Linear divergence reduction film |
| 32. | Light divergence reduction structure |
| 33. | Input aperture |
| 34. | Input surface |
| 35. | Output aperture |
| 36. | Output surface |
| 38. | Side wall |
| 40. | Diffuser |
| 44. | Input surface |
| 45. | Groove |
| 48. | Crossing point |
| 54. | Light guiding plate |
| 58. | Illumination system |
| 60. | Display apparatus |
| 62, 64, 66, 68. | Curve |
| 100. | Display apparatus |
| 110, 120. | Axis |
| 200. | LC layer |
| 202, 204. | Polarizer |
| 210, 212. | Compensator |

H = Height
W = Width
K = Pitch
L = Length
R. Ray

The invention claimed is:

1. A display apparatus comprising:
a) a light source;
b) a light guiding plate for transmitting light from the light source outward from a two-dimensional light-providing surface, one dimension of the light-providing surface defined in a width direction parallel to the path of incident light from the light source and the other dimension of the light-providing surface defined in a length direction, orthogonal to the width direction;
c) a linear divergence reduction surface for reducing the divergence of light from the light providing surface predominantly with respect to the width direction, to provide a linearly divergence-reduced illumination,
whereby divergence along the width direction at full-width half-maximum is less than about 50% of divergence at full-width half-maximum along the length direction;
d) a liquid crystal display component for modulating the linearly divergence-reduced light to form a modulated light according to image data, and,
e) a diffusing surface in the path of the modulated light;
wherein the linear divergence reduction surface comprises a film substrate featured with a plurality of light divergence reduction structures, wherein each light divergence reduction structure is longitudinally extended in the length direction along the light-providing surface, each light divergence reduction structure comprising:
(a) an input aperture optically coupled to the light-providing surface;
(b) an output aperture distal from said input aperture, wherein the output aperture has a surface area that is larger than the surface area of the input aperture and the width of the output aperture varies over the length of the light divergence reduction structure; and,
(c) a pair of curved side walls between the output aperture and the input aperture and extending along the length direction;
wherein, in a cross section taken orthogonally with respect to the width direction, the curved side walls approximate a parabolic curvature.

2. The apparatus according to claim 1 wherein the length direction is substantially parallel to the axis of a light bulb that provides source illumination.

3. The apparatus according to claim 1 wherein the light guiding plate and the linear divergence reduction surface are of the same material.

4. The apparatus according to claim 1 wherein the pitch between adjacent light divergence reduction structures is substantially equal.

5. The apparatus according to claim 1 wherein the liquid crystal display component employs in-plane switching.

6. The apparatus according to claim 1 wherein the liquid crystal display component is an optically compensated birefringence component.

7. The apparatus according to claim 1 wherein the linear divergence reduction surface is molded into the two-dimensional light-providing surface.

8. The apparatus according to claim 1 wherein the modulated light exhibits image contrast of better than about 150:1 without the use of a compensator article.

9. The apparatus according to claim 1 wherein the liquid crystal display component exhibits an asymmetric response to incident light, such that, for light at normal incidence, the luminance of modulated light from the liquid crystal display component with respect to the width direction of the linear divergence reduction surface differs from the luminance of modulated light of the liquid crystal display component with respect to the length direction of the linear divergence reduction surface by more than 10 degrees at full-width half maximum.

* * * * *